(12) United States Patent
Skourup et al.

(10) Patent No.: US 8,225,226 B2
(45) Date of Patent: *Jul. 17, 2012

(54) VIRTUAL CONTROL PANEL

(75) Inventors: Charlotte Skourup, Drammen (NO); John Pretlove, Sandvika (NO); Thomas Pettersen, Borgenhaugen (NO)

(73) Assignee: ABB Research Ltd., Zürich (CH)

( * ) Notice: Subject to any disclaimer, the term of this patent is extended or adjusted under 35 U.S.C. 154(b) by 770 days.

This patent is subject to a terminal disclaimer.

(21) Appl. No.: 10/585,124

(22) PCT Filed: Dec. 20, 2004

(86) PCT No.: PCT/IB2004/004246
§ 371 (c)(1),
(2), (4) Date: Jun. 2, 2009

(87) PCT Pub. No.: WO2005/066744
PCT Pub. Date: Jul. 21, 2005

(65) Prior Publication Data
US 2009/0300535 A1 Dec. 3, 2009

Related U.S. Application Data

(60) Provisional application No. 60/533,246, filed on Dec. 31, 2003.

(30) Foreign Application Priority Data

Mar. 31, 2004 (SE) ........................................ 0400874

(51) Int. Cl.
*G06F 3/048* (2006.01)
*G05B 19/00* (2006.01)

(52) U.S. Cl. .......................... 715/771; 715/856; 700/259

(58) Field of Classification Search .................. 715/771, 715/773, 764, 856; 345/156; 700/259
See application file for complete search history.

(56) References Cited

U.S. PATENT DOCUMENTS

| 5,803,738 | A | * | 9/1998 | Latham ........................... 434/29 |
| 6,288,716 | B1 | * | 9/2001 | Humpleman et al. ......... 715/733 |
| 6,614,422 | B1 | | 9/2003 | Rafii et al. |
| 6,618,425 | B1 | | 9/2003 | Carlesi et al. |
| 6,771,294 | B1 | * | 8/2004 | Pulli et al. ...................... 715/863 |
| 7,190,331 | B2 | * | 3/2007 | Genc et al. ........................ 345/9 |
| 7,236,854 | B2 | * | 6/2007 | Pretlove et al. ................ 700/246 |
| 7,245,273 | B2 | * | 7/2007 | Eberl et al. ......................... 345/7 |

(Continued)

FOREIGN PATENT DOCUMENTS
EP 1 271 293 A2 1/2003
(Continued)

*Primary Examiner* — Simon Ke
*Assistant Examiner* — Rashawn Tillery
(74) *Attorney, Agent, or Firm* — Venable LLP; Eric J. Franklin

(57) ABSTRACT

A system that enables a user to interact with a virtual control panel using a user controlled pointing object. The system includes a portable identification element, a tracking unit adapted to capture data representing the position of the pointing object and the position of the identification element, a storage unit, storing at least one pre-defined graphical interface representing a control panel of a device, a graphics unit, generating a graphical representation of the control panel, a registering unit, registering the graphical representation of the control panel in a fixed relation to the portable identification element to produce a virtual control panel and a display unit, showing the user a view including the real world and the virtual control panel.

23 Claims, 2 Drawing Sheets

U.S. PATENT DOCUMENTS

| | | | |
|---|---|---|---|
| 7,714,895 B2* | 5/2010 | Pretlove et al. | 348/211.2 |
| 7,787,992 B2* | 8/2010 | Pretlove et al. | 700/259 |
| 2002/0024675 A1* | 2/2002 | Foxlin | 356/620 |
| 2002/0044104 A1 | 4/2002 | Friedrich et al. | |
| 2002/0191004 A1 | 12/2002 | Ebersole et al. | |
| 2004/0046711 A1* | 3/2004 | Triebfuerst | 345/8 |
| 2004/0238732 A1* | 12/2004 | State et al. | 250/250 |
| 2005/0128184 A1* | 6/2005 | McGreevy | 345/156 |
| 2005/0256611 A1* | 11/2005 | Pretlove et al. | 700/264 |
| 2005/0264527 A1* | 12/2005 | Lin | 345/156 |
| 2006/0241792 A1* | 10/2006 | Pretlove et al. | 700/83 |
| 2006/0244677 A1* | 11/2006 | Dempski | 345/8 |
| 2008/0266323 A1* | 10/2008 | Biocca et al. | 345/633 |

FOREIGN PATENT DOCUMENTS

WO     WO/ 01/92944 A1    12/2001

* cited by examiner

VIRTUAL CONTROL PANEL

CROSS-REFERENCE TO RELATED APPLICATIONS

This application claims priority to U.S. provisional patent application 60/533,246 filed 31 Dec. 2003 and Swedish patent application 0400874-4 filed 31 Mar. 2004 and is the national phase under 35 U.S.C. §371 of PCT/IB2004/004246 filed 20 Dec. 2004.

FIELD OF THE INVENTION

The present invention relates to a system and a method that enables a user to interact with a virtual control panel using a user controlled pointing object. The system comprises a first tracking unit adapted to capture data representing the position of the user controlled pointing object.

The virtual control panel represents an interface for real-time human-system interactions. The invention can be applied for different industrial processes where a user needs a control panel for interacting with a device or system, hereinafter referred to collectively as a device, regarding for example real-time data, historical data, simulations, test data, etc. The invention is particularly useful in automation applications.

PRIOR ART

A field operator, e.g. in process plants, manufacturing, at off-shore platforms and substations, need both to interact with systems or devices and to have access to information and documentations. Various user interfaces, both physical and software interfaces, towards devices and system are often differently designed and the field operators have to learn to use every single user interface. The different interfaces often are very inconsistent. In addition to the two-way interaction with devices or systems, the field operators need access to documentation, such as manual, historical data, maintenance & repair reports. Even though the trend is that such documentation becomes electronically available, it often resides at different systems and locations. Therefore, the field operators have to plan their work tasks in advance, or they even have to interrupt ongoing tasks in order to control the process or devices and find supportive information and documentation.

Within manufacturing, a production line includes several robots, which are controlled by separate controllers and teach pendants. The operator need to interact with the robots, for example, in order to check status, inspect the robots and make new programs. A general drawback is that the operator must change interaction device for each new robot even though several robots may perform a task together.

Augmented Reality (AR) is a method of overlaying real world representations with computer-generated graphics. Ideally, for vision-based augmented reality, the user will not be able to recognize the difference between the real and the computer-generated graphics, and thereby the user will get an improved perception of the real world environment. Today, augmented reality techniques are used in a number of applications. Examples of use are within media, for example weather reporting, medicine, for example visualization of internal organs, for collaborative environments, for example virtual meeting rooms, and in process industries for maintenance and service.

Handheld and wearable control panels with interaction possibilities already exist and the interest of such devices increases. The use of mobile phones and PDAs as the interface towards systems or devices is known. Also, tablet PCs, which are used, e.g. within hospitals, provide an interface that the user easily carries around and interacts with by touching the screen.

The newest field that is related to the invention is virtual keyboards. A virtual keyboard is projected, e.g. at a table, and will typically be the input mean for a PDA. The user touches or presses the keys and the system recognizes the specific touched keys like a standard keyboard. Virtual keyboards are commercial products offered by several manufacturers, e.g. Canesta, Senseboard Technologies and Samsung.

U.S. Pat. No. 6,614,422 discloses a digital user input to a companion system such as a PDA, a cell telephone or an appliance device, using a virtual input device such as an image of a keyboard. A sensor captures three-dimensional positional information as to location of the user's fingers in relation to where keys would be on an actual keyboard. This information is processed with respect to finger locations and velocities and shape to determine when a virtual key has been struck. The processed digital information is output to the companion system.

U.S. Pat. No. 6,618,425 disclose a virtual laser operator. A laser controller interconnected with an electric discharge laser communicates with a remote computer incorporating a display screen programmably emulating a conventional keyboard. The display screen has a plurality of imaged virtual keys each programmably emulating a physical key of a conventional keyboard. A keystroke is typically applied by manually pressing the position of a corresponding virtual key on a touch sensitive screen, or alternatively by actuating a conventional pointing device.

The issue of interacting with virtual graphics has been addressed, for example, in the film "Minority report". There is a scene where Tom Cruise uses his hands to interact with virtual information visualized on a Plexiglas "wall". He further uses gestures for the interaction.

OBJECTS AND SUMMARY OF THE INVENTION

The object of the present invention is to provide a portable control panel that the user can carry with him and which weighs almost nothing.

This object is achieved by means of the initially defined system, characterized in that the system further comprises: a portable identification element, a second tracking unit adapted to capture data representing the position of the identification element, a storage unit, storing at least one predefined graphical interface representing a control panel of a device, said graphical interface comprising an interface for user interactions with the device, a graphics unit, generating a graphical representation of the control panel based on said stored graphical interface, a registering unit, registering said graphical representation of the control panel in a fixed relation to said portable identification element, based on said data representing the position of the identification element, to produce a virtual control panel, a display unit, showing the user a view comprising the real world and the virtual control panel projected in a fixed relation to said portable identification element, and an application unit, performing actions in response to the users interactions with the virtual control panel, and determining which actions to be performed based on the position of said user controlled pointing object in relation to the identification element. With a device is meant either a single device or a system comprising several devices. A virtual control panel is an augmented reality view of a real control panel. However, the virtual control panel may not necessarily have the same look as conventional control panels.

The user interacts with the virtual control panel using a pointing object. The pointing object is for example a handheld pointing device or a part of the user's body, e.g. a hand or a finger.

Preferably, said portable identification element is adapted to be carried by the user. The user may for example carry the identification element in his hand or attached to his body, e.g. attached to his arm or to a watch. If the user uses his finger as a pointing device and carries the identification element attached to the body, the user will have both his hands free to use for other purposes. A portable identification element can be put aside, e.g. on a table while the user performs other tasks.

The virtual control panel is implemented as augmented reality (AR), which is computer-generated graphics combined with the real world. The field operator "carries" the virtual control panel with him. The virtual control panel is attached to the identification element, which is recognized by the second tracking unit. The virtual control panel only exists as data projections. The virtual control panel represents the user interface for interacting with process devices and/or systems. The virtual control panel comprises for example interaction buttons, menus and input means for set point changing.

The low weight of the virtual control panel, i.e. the weight of the identification element, and the fact that it can be attached to the body and is wireless, are clear advantages of the virtual control panel according to the invention.

According to an embodiment of the invention the system is adapted to modify the appearance of the virtual control panel in response to interactions between the user controlled pointing object and the virtual control panel. This embodiment makes it possible for the user to navigate in different views of the virtual control panel and to interact with the control panel, for example to scroll a view and look into menus.

According to an embodiment of the invention at least one of the stored graphical interfaces comprises more than one graphical view to be displayed on the virtual control panel, and which of the views to be displayed is determined based upon the users actions. As the virtual control panel may not have the exact same look as a conventional control panel, a device may have more than one graphical views related to it.

According to an embodiment of the invention said graphical interface is adapted to display data from the device, and the system is adapted to generate a graphical representation of the data and to display the data on the virtual control panel. Preferably, the data is displayed in response to interactions between the user controlled pointing object and the virtual control panel. Examples of data visualized on the virtual control panel are real-time data, status monitoring, reports and other textual documents, historical data in form of trend curves and 3D simulations. Some of the graphical views of the virtual control panel will contain online data for devices in the process that allows a two-way interaction between the virtual control panel and the related device. When such data is updated due to changes in the process or within the device, e.g. change of temperature or pressure, this will automatically be updated at the virtual control panel. On the other hand, the user may change, e.g. the set-point for a specific device from the virtual control panel, and that device will automatically change its set-point.

According to an embodiment of the invention, the storage unit is adapted for storing a plurality of graphical interfaces, each representing a control panel of a particular device, that the system is adapted to generate and display a plurality of graphical representations of control panels for different devices based on said stored graphical interfaces of the devices, and that the system comprises means for identifying which of the stored control panels to be displayed. The representations of different virtual control panels are defined in advance and stored in the storage unit, e.g. at a computer or a server. This embodiment provides the user with a control panel that can be used for interacting with a plurality of different devices or systems. The virtual control panel adapts its appearance, interface, and content to a specific device, for example to the device that the user stands in front of, or closest to. The AR system visualizes the related virtual control panel, which may provide a range of different information and information presentations.

According to an embodiment of the invention said means for identifying which of the stored control panels to be displayed comprises a recognition unit for recognizing and identifying devices in the environment of the user, and the system is adapted to determine which of the stored control panels to be displayed based on which of the device is identified. For example, the recognition unit is adapted to recognize and identify unique identification markings on the devices. For instance, the recognition unit is adapted to detect the identity of the closest device. The virtual control panel changes its look and functionality depending on which device is recognized.

According to an embodiment of the invention the system is arranged so that it changes the virtual control panel displayed when another device is recognized and identified. Thus, when the user moves towards another device, the virtual control panel change its look to represent the functionality and characteristics of the new device when the user has confirmed that he wants the virtual control panel of the other device. There may be cases where the devices physically are close to each other and the user may not change the virtual control panel just because he takes a step aside, for example, to get a better view of the specific device without having the intention to change the virtual control panel to the virtual control panel for the neighbour device.

According to an embodiment of the invention said display unit comprises a wearable display showing the user said view. For example, the field operator wears glasses or a head-mounted display, on which the computer-generated graphics are projected either as optical see-through or as video see-through.

A further object of the invention is to provide a method that enables a user to walk around and interact with a virtual control panel using a user controlled pointing object.

According to an aspect of the invention, the object is achieved by a computer program directly loadable into the internal memory of the computer or a processor, comprising software code portions for performing the steps of the method according to the invention, when said program is run on a computer. The computer program product is provided either on a computer readable medium or through a network, such as the Internet.

According to another aspect of the invention, the object is achieved by a computer readable medium having a program recorded thereon, when the program is to make a computer perform the steps of the method according to the invention, and said program is run on the computer.

Advantages gained by this invention is that the field operator always has the control panel with him, the easy standardization of the various user interfaces, the user only has to interact with a single interface which changes its representation, e.g. look, content and functionality, in dependence of the closest and confirmed device, and that the virtual control panel weights almost nothing. The field operator can put the virtual control panel aside while he is doing other tasks, e.g. put it down on a table, the floor, etc. The virtual control panel itself has no need for ruggedized or intrinsic safe certification.

BRIEF DESCRIPTION OF THE DRAWINGS

The invention will now be explained more closely by the description of different embodiments of the invention and with reference to the appended figures.

DETAILED DESCRIPTION OF PREFERRED EMBODIMENTS OF THE INVENTION

This invention proposes a system and a method for providing a virtual control panel, which adapts its interface and content to a device and/or a system by using augmented reality. A system for generating an augmented reality representation of computer-generated graphical information overlaid the real world can be configured in different ways. The two most likely ways of visualizing augmented reality are Video see-through and Optical see-through. Video see-through needs a camera to capture a live video stream of the environment corresponding to the user's view of the world. The system combines computer-generated graphics with the live video stream and projects the combined augmented reality video onto the display device. The user will see the video with overlaid virtual information as if he was looking at the real world. For optical see-through, the computer-generated graphics are registered directly onto the display device and follows the user's view of the real world. The virtual graphics are overlaid the real world without including a video of it. The former solution is less demanding regarding the frame rate.

Figure 1:
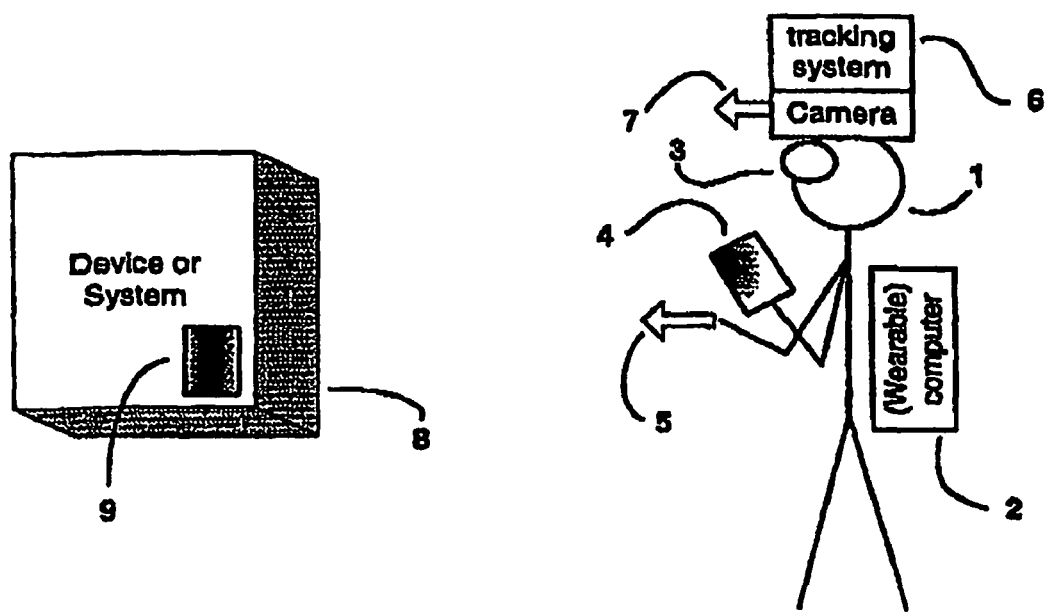
FIG. 1 shows a system for providing a virtual control panel according to an embodiment of the invention.

FIG. 1 shows an embodiment of a system according to the invention. The system comprises a handheld interacting and pointing device 1, a handheld or otherwise wearable identification element 3 having a unique identification (ID), a tracking unit 5 for determining the position of the pointing device 1 and the position of the identification element 3 in relation to a world coordinate system, a wearable display device 7 for visualizing augmented reality overlaid the view of the real world, identification markings 9a, 9b, having unique Ids, for placing at devices 11a, 11b in the environment, and a recognition system for recognizing the identification markings. Preferably, the tracking unit also determines the orientation of the pointing device 1 and the identification element 3.

A virtual control panel is an augmented reality view of a real control panel. In this embodiment video see-through is used to generate and present the virtual control panel in relation to the identification element 3. The identification element 3 defines the position and orientation of the virtual control panel. The identification element is for example a piece of paper or plastic provided with a unique ID such as a bar code or any other identification means.

The virtual control panel is visualized at the wearable display device 7. The wearable display device 7 is for instance glasses, a head-mounted display or a head-up display.

The system further comprises a camera 12 for capturing a stream of images of the environment, i.e. of the real world. The camera 12 is mounted in a fixed position relative to the display device 7, for example mounted on or integrated with the display device. The display device is located along the view axis of the camera and at the camera's image plane. Thus, the camera is located in relation with the display in such a way that it provides the same view, as the user would get by looking directly at the real world. The live video stream of images is combined with computer-generated graphics representing the control panel, and the combination of the real world and the graphics is presented in real-time at the display device 7. Additional functionality includes camera zooming with output of the actual camera focal length. This will enable the system to display the computer-generated graphics correctly while zooming. The camera 12 may also be used for vision-based tracking by the tracking unit 5.

Basically, two tracking units are needed for the virtual control panel system, in addition to a recognition system for recognizing the identification markings attached to the devices in the environment. The first tracking unit traces and determines the position, and possibly also the orientation, of the pointing device 1, whereas the second tracking unit traces and determines the position and orientation of the identification element 3 held by the user. These tracking units may be a single tracking unit used for tracing both, as in the embodiment shown in FIG. 1, or two different tracking units. Examples of other possible tracking methods and systems are ultrasonic tracking systems, magnetic tracking systems, tracking systems based upon inertial navigation (using accelerometers and gyros), mechanical arms, optical systems and hybrid systems combining technologies previously mentioned. For some of the tracking systems, the pointing device 3 and the identification element 3 may have integrated sensors for determining positions and orientations. Such sensors may, for example, be gyros, inertial sensors and accelerometers.

In this embodiment the user uses the pointing device 1 for interacting with the virtual control panel and for pointing in the environment. The camera 12 is used as vision-based tracking of the pointing device 1. The pointing device 1 can also be used for additional tasks such as to drag the virtual control panel, or other virtual information, from the identification element 3 to a specific device and to locate, select, show, etc. new positions in the environment.

The embodiment disclosed in FIG. 1 uses vision-based tracking. The tracking unit 5 utilizes the camera 12 for the vision-based tracking. The tracking unit 5 also includes a tracking module 15 comprising software for performing the tracking. The position and orientation of the pointing device 1 and the identification element 3 are determined by means of image recognition and the tracking module 15 comprises image recognition algorithms. The camera 12 and the tracking module 15 can also be used for specifying the world coordinate system.

Further the system comprises a wearable computer 17 containing the necessary software in order to generate one or a plurality of virtual control panels based upon the output from the tracking module 15 and the video stream from the camera 12. The wearable computer 17 also contains the necessary software needed to perform the desired task or process, e.g. two-ways communication with devices, real-time data managing and visualization. Further, the wearable computer 17 will generate the graphics, which will provide the augmented reality interface view. Finally, the wearable computer 17 will contain a storage unit in order to save, and restore previously saved, information for example predefined graphical interfaces to devices. In another embodiment a stationary computer, or a server/client solution, could be used instead of the wearable computer.

Communication of information between the wearable computer 17 and the camera 12, tracking module 15, and the display device 7 is done through a wired or wireless link.

Depending on the type of tracking unit, the pose of the interacting and pointing device 1 can come from the pointing device itself, or from an external tracking unit.

A user 19 holds the identification element 3 in his hand or wears it on his body, e.g. around his hand wrist. The user holds the pointing device 1 in his other hand. The user also wears the display device 7 and the wearable computer 17. The user may walk around in the environment carrying the virtual control panel. The tracking unit 5 recognizes known identification markings 9a, 9b in the environment. In case the tracking unit is vision-based, the user wears a camera 12 attached to his head. The camera records live video of the real world.

A fixed world coordinate system needs to be defined. The origo of the world coordinate system is defined to correspond with the display device 7. As the camera 12 is mounted on, or integrated with, the display device, the relation between the camera and the display device is known. The system determines the position of the pointing device 1 and the identification element 3 in relation to the display device 7. Hence, all pose information provided by the tracking unit is related to this world coordinate system.

The system also needs to recognize and identify the identification markings 9a, 9b on the devices in the environment. The identification markings are attached in advance to devices and systems, which the user wants to interact with. Different technologies can be used for the recognition such as RF tagging, bar codes, ultrasound and GPS. Alternatively, a vision based tracking unit as described above can be used to recognize the identification markings. It is also possible to recognize the devices themselves by natural feature recognition.

In relation to each device, virtual interfaces need to be defined in the system. Also, potential communication between the virtual interfaces and the devices must be defined and set up in advance. The tracking unit 5 determines the ID of the specific devices based on the ID of the identification markings 9b, 9a. The ID's have corresponding virtual interfaces, which are presented as the virtual control panels.

When the user starts using the system, he walks around in the environment until he comes to a device, which he wants to interact with. There may be several ways for the system and the user to decide which device should be presented on the virtual control panel. The user moves the identification element 3 next to the device until the system has recognized both the ID for the specific device and the identification element ID within a predetermined distance. Another way is to select the actual device from a dynamic list of all online devices, that is devices within a certain distance of the user so that there is robust communication with the device. The related virtual interface appears as a virtual control panel attached to the identification element. The user uses the interaction and pointing device 1 to interact with the virtual control panel, which may include interaction buttons, menus and other types of interaction possibilities. The virtual control panel updates its look and content corresponding to the user's choices.

The virtual control panel changes its look and content as the user either moves along to a new device, having an identification marking, or as the user interacts with the virtual control panel. Examples of virtual interfaces are device overviews, status information, set points, trend curves, documentation, video clips, e.g. for maintenance and procedures, and data entry. The virtual control panel can be combined with other interaction modalities such as voice and tactile feedback. Typically, the virtual control panel may give an audio and/or a visual feedback when the user pushes an interaction button.

The user can move the identification element freely, both regarding position and orientation, and the virtual control panel will follow the identification element as if it is physically attached to the element. The related tracking unit captures the movements of the identification element and transmits its position and orientation to the wearable computer by means of a communication link, e.g. wireless communication. Hence, the user can put the virtual control panel away, e.g. in a pocket when he is not using it, or put the virtual control panel on a table, etc. when doing other tasks.

The wearable computer 17 communicates by wireless communication with the devices, e.g. to retrieve and send data. Readings from the devices may be presented on the virtual control panel whereas the user may modify, e.g. the set point of a device.

Figure 2:
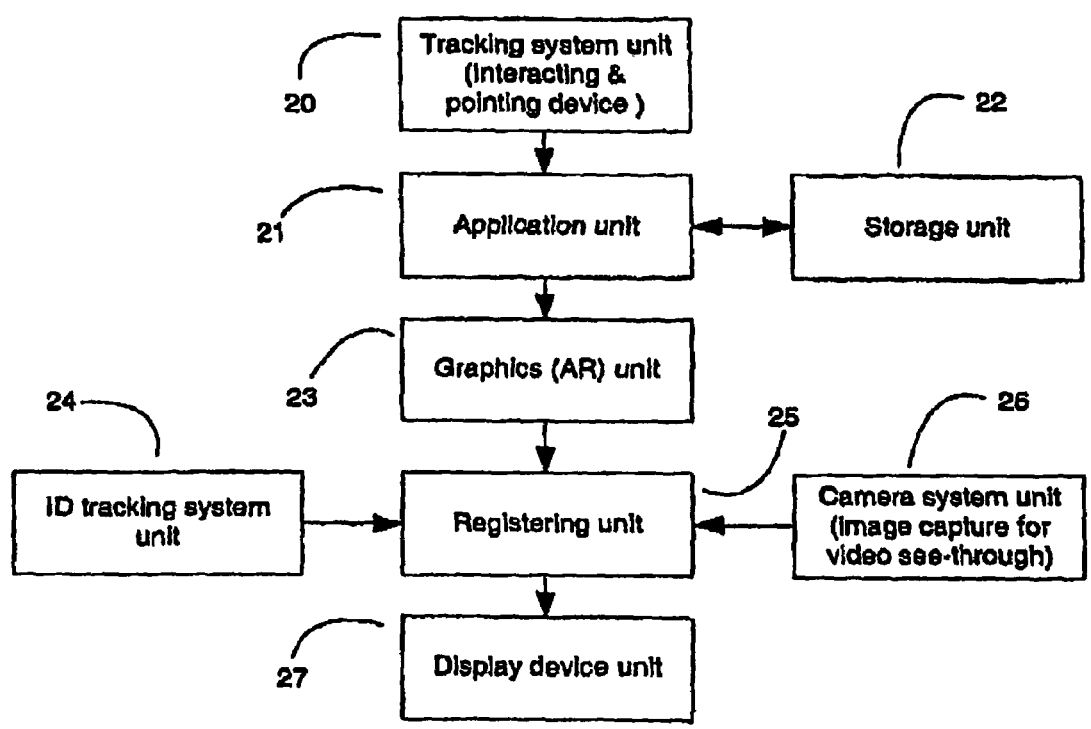
FIG. 2 shows a block scheme over a system according to the invention.

FIG. 2 shows a block scheme over the system. The tracking unit 15 comprises a first tracking unit 15a for tracking the position and orientation of the pointing device 1, and a second tracking unit 15b for tracking the position and orientation of the identification element 3. The tracking units 15a, 15b are adapted to determine the position and orientation of the pointing device 1 and the identification element 3 by means of image recognition, based on the images from the camera 12. Output from the tracking module 15a is the position and orientation of the pointing device 1, and output from the tracking module 15b is the position and orientation the identification element, which outputs are transferred to an application unit 21.

The application unit 21 contains the necessary software in order to perform the desired process or task, e.g. integrate real-time data with the recognized device, and perform actions based on input from the pointing device 1. Which action to be performed depends on the position of the pointing device relative to the identification element and on stored functionality of the control panel. Further, the application unit 21 holds information regarding the world coordinate system. Hence, the application unit 21 is dependent on the specific system and environment.

A graphics unit 23 generates a 3D graphical representation of the visual information that is to be displayed in relation to the identification element 3. That is, this unit holds a specification of the 3D graphical primitives to be visualized. The graphics unit 23 receives information from the application unit 21 regarding the virtual graphical information to be displayed based on user input, stored information and information received from the controlled device. All graphical primitives positions are specified in relation to the world coordinate system. For a robot programming application relevant visual information may be user-specified waypoints, the actual robot path, task specific information etc. The graphical representations produced in the graphics unit 23 are transmitted to a registering unit 25.

The camera 12 produces live video real world images, which are input to the registering unit 25. The position and orientation of the camera and display is determined according to the world coordinate system, and is used by the registering unit 25 in order to overlay the real world scene with computer-generated graphics from the graphics unit 23. The registering unit 25 combines the virtual graphics from the graphics unit 23 with video images from the camera 12. With the registration correctly done, the computer-generated graphics will be virtually "attached" to the real world scene. The position and orientation of the identification element is transferred from the tracking unit 15b to the registering unit. The computer-generated graphics represents the virtual control panel and its location in relation to the real world is determined based on the position and orientation of the identification element. The combined images are displayed on the display device 7.

A storage unit 29 enables saving and loading of application related information, e.g. application related information, graphical interfaces for the various devices, and system configuration parameters, e.g. local and world coordinate frame. The storage unit is also adapted to store a plurality of pre-defined graphical interface representing control panels of devices and/or systems, which graphical interfaces comprises interfaces for user interactions with the device.

In this embodiment, the camera 12 and a vision-based tracking system is used for detecting the identification markings on the devices. A recognition unit 31 recognizes and identifies devices in the environment of the user, based on output from the camera 12. The recognition unit 31 recognizes the identification markings on the devices, reads the ID on the marking and identifies the device by comparing the read ID with ID's stored in advance.

When a device is identified, the recognition unit 31 informs the application unit 21 about which device is identified, and then it is possible for the application unit to determine which of the stored control panels to be displayed. When a new device is recognized and identified, the identity of the device is displayed to the user, who can choose between accepting the new device, or rejecting it. If the user accepts the new device, the application unit automatically retrieves the graphical interface of the new identified device from the storage unit 29, and delivers the new graphical interface to the graphics unit 23. Thereby, the virtual control panel displayed is changed when a new device is identified, and when the user has confirmed the shift of the graphical interface.

As the virtual control panel may not have exactly the same look as a conventional control panel, a device may have more than one graphical view related to it. Thus, the graphical interface may contain more than one graphical view. As an example, the first graphical view of the virtual control panel for a pump that meets the user may be an overview of the performance visualized as an analogue instrument indicating the performance ranging from 0 to 100%. The specific performance information for the pump is retrieved in real-time from the pump device via the computer and some communication means, preferably wireless, between the computer and the device, or via a server.

The graphical view may further have interaction buttons for 'on/off', 'Set-point' and 'Main menu'. These buttons may be presented as 3D objects on the graphical view. The 'on/off' interaction button may be color-coded so that it, for example, is green when the pump is on and red when the pump is stopped. Additionally, the text at the interaction button may change between 'On' and 'Off' to indicate the status. When the pump is running the status is 'on', the interaction button may look like it is pressed, colored in green with the text 'On'. When the pump is stopped, the interaction button will have changed its color to red, with the text 'Off' and the interaction button may look like it is un-pressed.

The interaction button 'Set-point' may bring up a different graphical view representing a view for change the set-point. The set-point may be visualized as a number in a display which can be selected. The user may choose between different ways of changing the set-point. One way is to select the displayed number and enter a new number for the new set-point. Another way may be to adjust the set-point using inter-action buttons for 'up' and 'down'. The set-point will be updated immediately in the display. Regarding the way to change set-point, the user may confirm the new set-point before the device is updated (in real-time).

The main menu may, for example, contain options for 'Performance', 'Set-point', 'Documentation', 'Trend curves', and 'Maintenance history'. These options may, for example, be presented as interaction buttons, menus or tabs. 'Documentation' may include documentation for various user groups and usages, for example, user manuals for the device, procedures, technical manuals, reports, etc. When the user has selected the type of documentation, it may be shown page by page where the user can select 'next' and 'previous', e.g. by interaction buttons. As a part of documentation, pictures, graphics and videos may also be included.

The graphical views are designed and developed beforehand and stored in the storage unit. In relation with the graphical views, the position of and content of interaction field on the graphical views are also stored, similarly are the data fields stored. When a graphical view is uploaded related to the virtual control panel, data is automatically filled in the data field. User interactions with the virtual control panel are taking care of by the tracking system, which traces the pointing object's position. The application unit notices when the position of the pointing object matches any of the interaction fields at the specific graphical view of the virtual control panel.

In one use-case, a user working within a plant needs to check and update an existing robot program to make sure that the program modules are downloaded and related to the right robots. Four robots are included in the program. He then has to log in at each of the four teach pendants, one at a time, scroll down in the menus and find the right program and the right place in the program. By utilizing the proposed invention, the user would only need to walk next to the appropriate robot and then check the program for each of the four robots. Costs related to maintaining the teach pendants will be reduced. Also, the problem with wires between the robot controller and the teach pendant is avoided with the virtual control panel.

In process plant environments the user walks around and performs monitoring, inspection and maintenance tasks related to a process or device. The user typically has two-way radio communication with the control room users to transfer information to and from the process. The virtual control panel provides the field user with an interface for online interacting with the various devices and systems in the field as well as a tool for viewing documentation, reports, maintenance and service procedures, etc. The user always carries the virtual control panel with him. He can put it aside, or attach it, e.g. to his arm, while doing other tasks. The field user will be able to perform his tasks more efficiently. Also, the use of the virtual control panel prevents errors due to communication problems between the field user and the control room (misunderstandings, noise, etc.). The control room users may also have the opportunity to see updated data and information from the plant.

The virtual control panel can also be used for other applications such as registration and counting in stores. Combined with bar codes, the virtual control panel may visualize information related to the registered part. The user can enter data and information as well as reading status and documentation.

Another example application is an office. The virtual control panel may provide the user with names of people by passing the doors, or the people themselves if the employees are equipped with IDs. For example, the security staff may have virtual control panels for checking IDs, changing passwords, recording status information from their check rounds, etc.

The present invention is not limited to the embodiments disclosed, but may be varied and modified within the scope of the following claims. For example a device could be identified by the user inputting an identification number to the system.

Alternatively, the user may use his hand and fingers for interacting with the virtual control panel. The system still needs to determine the pose of the interaction body part. A similar tracking unit, as for the interacting and pointing device, can be used for hand/finger tracking. The system further needs a recognition system in order to recognize the interacting body part and determine its position.

In addition to using his fingers or a pointing device, the field user may interact with the virtual control panel using other interaction means such as voice and physical interaction buttons.

For example, the p resent system is not limited to augmented reality systems utilizing a composed video image but may also be utilized in see-through augmented reality systems, in which only the computer generated graphics are presented to the user who views the graphics with the real world in the background.

In another embodiment, instead of having a display device, the display unit is arranged so that the view is directly projected on the eyes of the user. For example, a virtual retinal display, where information is projected directly into the retina without the need of a physical display device, could be used.

The invention claimed is:

1. A system that enables a user to interact with a virtual control panel for controlling an industrial device or system, the system comprising:
    a pointing object carried and manipulated by the user for interacting with the virtual control panel to control the industrial device or system,
    a first tracking unit adapted to capture data representing a position of the pointing object,
    a portable identification element carried and manipulated by the user, the portable identification element being configured to define a position and orientation of the virtual control panel,
    a second tracking unit adapted to capture data representing a position of the portable identification element,
    a storage unit configured to store at least one pre-defined graphical interface representing a control panel of the industrial device or system,
    a graphics unit configured to generate a graphical representation of the control panel based on said stored graphical interface,
    a registering unit configured to register said graphical representation of the control panel in a fixed relation to said portable identification element, based on said data representing the position of the portable identification element, to produce the virtual control panel,
    a display unit configured to show the user a view comprising the real world and the virtual control panel projected in a fixed relation to said portable identification element, and
    an application unit configured communicate with the industrial device or system to perform actions to control the industrial device or system in response to the interactions of the user with the virtual control panel, and configured to determine which actions to control the industrial device or system to perform based on the position of said user controlled pointing object in relation to the identification element.

2. The system according to claim 1, wherein the system is adapted to modify the appearance of the virtual control panel in response to interactions between the user controlled pointing object and the virtual control panel.

3. The system according to claim 1, wherein said graphical interface is adapted to display data from the device and wherein the system is adapted to generate a graphical representation of the data and to display the data on the virtual control panel.

4. The system according to claim 1, wherein said user controlled pointing object is a handheld pointing device or a part a body of the user.

5. The system according to claim 1, wherein the storage unit is adapted to store a plurality of graphical interfaces, each representing a control panel of a particular device, wherein the system is adapted to generate and display a plurality of graphical representations of control panels for different devices based on said stored graphical interfaces of the devices, and wherein the system further comprises:
    an identification unit configured to identify which of the stored control panels to be displayed.

6. The system according to claim 5, wherein said identification unit comprises a recognition unit configured to recognize and identify devices in the environment of the user, and wherein the system is adapted to determine which of the stored control panels to be displayed based on which of the devices is identified.

7. The system according to claim 6, wherein said recognition unit is adapted to recognize and identify unique identification markings on the devices.

8. The system according to claim 5, wherein the system is arranged so the virtual control panel displayed changes when another device is recognized and identified, and when the user has accepted the other device.

9. The system according to claim 1, wherein said portable identification element is adapted to be carried by the user during interaction with the virtual control panel.

10. The system according to claim 1, wherein said portable identification element is attachable to a body of the user.

11. The system according to claim 1, wherein said display unit comprises a wearable display device showing the user said view.

12. A method that enables a user to interact with a virtual control panel for controlling an industrial device or system using a user controlled pointing object, the method comprising:
    receiving data representing a position of the user controlled pointing object,
    receiving data representing a position of a portable identification element carried and manipulated by the user,
    storing at least one pre-defined graphical interface representing a control panel of the industrial device or system,
    generating a graphical representation of the control panel of the device based on said pre-defined graphical interface,
    registering said graphical representation of the control panel in a fixed relation to said portable identification element, based on said data representing the position of the identification element, to produce the virtual control panel in a position and orientation defined by the user with the portable identification unit,
    displaying a view comprising the real world and the virtual control panel projected in a fixed relation to said portable identification element, and
    performing actions to communicate with the industrial device or system to control the industrial device or system in response to the interactions of the user with the virtual control panel, wherein the actions to control the industrial device or system to be performed is determined based on the position of said user controlled pointing object in relation to the position of the virtual control panel.

13. The method according to claim 12, further comprising: modifying the appearance of the virtual control panel in response to interactions between the user controlled pointing object and the virtual control panel.

14. The method according to claim 12, further comprising: defining a two-way communication between the virtual control panel and the device,
sending information to the device regarding the users actions with the virtual control panel,
receiving data from the device, generating a graphical representation of the received data and
displaying the data on the virtual control panel.

15. The method according to claim 14, wherein said data is displayed on the virtual control panel in response to interactions between the user controlled pointing object and the virtual control panel.

16. The method according to claim 12, further comprising: storing a plurality of pre-defined graphical interfaces, each representing a control panel of a particular device,
determining which of the stored control panels to be displayed, and
generating a graphical representation of the control panel to be displayed based on the pre-defined graphical interface of the control panel to be displayed.

17. The method according to claim 12, wherein at least one of the stored graphical interfaces comprises more than one graphical view to be displayed on the virtual control panel, and which of the views to be displayed is determined based upon actions of the user.

18. The method according to claim 16, further comprising: recognizing and identifying a device,
determining which of the stored control panels to be displayed based on the identified device, and
generating graphical representation of the control panel of the identified device based on the stored graphical interface of the identified device and displaying a view comprising the real world and the virtual control panel of the identified device projected in a fixed relation to said portable identification element.

19. The method according to claim 18, wherein each device is provided with a unique identification marking and a device is recognized by identifying its the unique identification marking.

20. The method according to claim 18, wherein the virtual control panel displayed is changed when another device is recognized and identified, and when the user has accepted the device.

21. The method according to claim 12, wherein said portable identification element is carried by the user during interaction with the virtual control panel.

22. The method according to claim 12, wherein the virtual control panel comprises virtual interaction members and an audio and/or visual feedback is generated when the user activates any of the virtual interaction members.

23. A computer program product, comprising:
a non-transitory computer readable medium; and
program instructions recorded on the computer readable medium which, when loaded into a computer, causes the computer to perform a method that enables a user to interact with a virtual control panel for controlling an industrial device or system using a user controlled pointing object, the method comprising
receiving data representing a position of the user controlled pointing object,
receiving data representing a position of a portable identification element carried and manipulated by the user,
storing at least one pre-defined graphical interface representing a control panel of the industrial device or system,
generating a graphical representation of the control panel of the device based on said pre-defined graphical interface,
registering said graphical representation of the control panel in a fixed relation to said portable identification element, based on said data representing the position of the identification element, to produce the virtual control panel in a position and orientation defined by the user with the portable identification unit,
displaying a view comprising the real world and the virtual control panel projected in a fixed relation to said portable identification element, and
performing actions to communicate with the industrial device or system to control the industrial device or system in response to the interactions of the user with the virtual control panel, wherein the actions to control the industrial device or system to be performed is determined based on the position of said user controlled pointing object in relation to the position of the virtual control panel.

* * * * *